United States Patent [19]
Dong et al.

[11] Patent Number: 4,774,603
[45] Date of Patent: Sep. 27, 1988

[54] INTEGRAL TAPE PATH ASSEMBLY INCLUDING SPEED SENSOR GUIDE SUBASSEMBLY WITH OFF-CENTER SPRUNG WASHER

[75] Inventors: John W. Dong, Fort Collins; Leslie G. Christie, Jr.; Ronald L. Abramson, both of Greeley, all of Colo.

[73] Assignee: Hewlett-Packard Company, Palo Alto, Calif.

[21] Appl. No.: 913,156

[22] Filed: Sep. 26, 1986

[51] Int. Cl.⁴ .................... G11B 15/46; G11B 15/60
[52] U.S. Cl. .......................... 360/71; 360/73
[58] Field of Search ........... 360/71, 73, 130.2, 130.21; 242/186, 190, 191; 226/44, 45

[56] References Cited

U.S. PATENT DOCUMENTS

| | | | |
|---|---|---|---|
| 3,318,547 | 5/1967 | Bejach | 242/190 |
| 3,517,895 | 6/1970 | Kraft | 242/190 |
| 3,665,098 | 5/1972 | Yano et al. | 360/71 |
| 3,787,690 | 1/1974 | Neff | 242/190 |
| 3,829,038 | 8/1974 | Studer | 242/190 |
| 4,104,685 | 8/1978 | Chang | 360/71 |
| 4,107,745 | 8/1978 | Burke, Jr. | 360/73 |
| 4,213,160 | 7/1980 | Shun et al. | 360/71 |
| 4,351,493 | 9/1982 | Sonnek | 242/190 |
| 4,381,089 | 4/1983 | Kondo | 242/191 |
| 4,390,909 | 6/1983 | Sakamoto | 360/71 |
| 4,494,712 | 1/1985 | Godwin, Jr. et al. | 242/191 |
| 4,508,292 | 4/1985 | Kudelski | 242/190 |

OTHER PUBLICATIONS

IEEE Standard Dictionary of Electrical and Electronics Terms, 1984, p. 405.

*Primary Examiner*—Raymond F. Cardillo
*Assistant Examiner*—David L. Robertson
*Attorney, Agent, or Firm*—William W. Cochran

[57] ABSTRACT

An integral tape path assembly (110) includes a head subassembly (112), a buffer/guide subassembly (114) and a spaced sensor/guide subassembly (116), all mounted to a common tape path plate (118). The buffer/guide subassembly includes a buffer arm (126) which pivots about an axis shared by a fixed guide (128). A Hall-effect position sensor (186) can be mechanically calibrated via an aperture (142) in a housing (132). The speed sensor/guide subassembly includes a roller (148) which serves to guide the tape on the take-up side of the tape drive system and to drive a shaft (152) holding a speed indicator (156) for a speed sensor (158). The speed sensor/guide subassembly includes a fixed-orientation washer (206) for urging the tape against an upper flange (208) of the roller. The washer is off-center sprung to counter distorting forces engendered by the tape as it engages the roller. Accordingly, a compact tape path assembly is provided requiring a reduced number of precision alignments and minimizing sources of tape distortion.

4 Claims, 6 Drawing Sheets

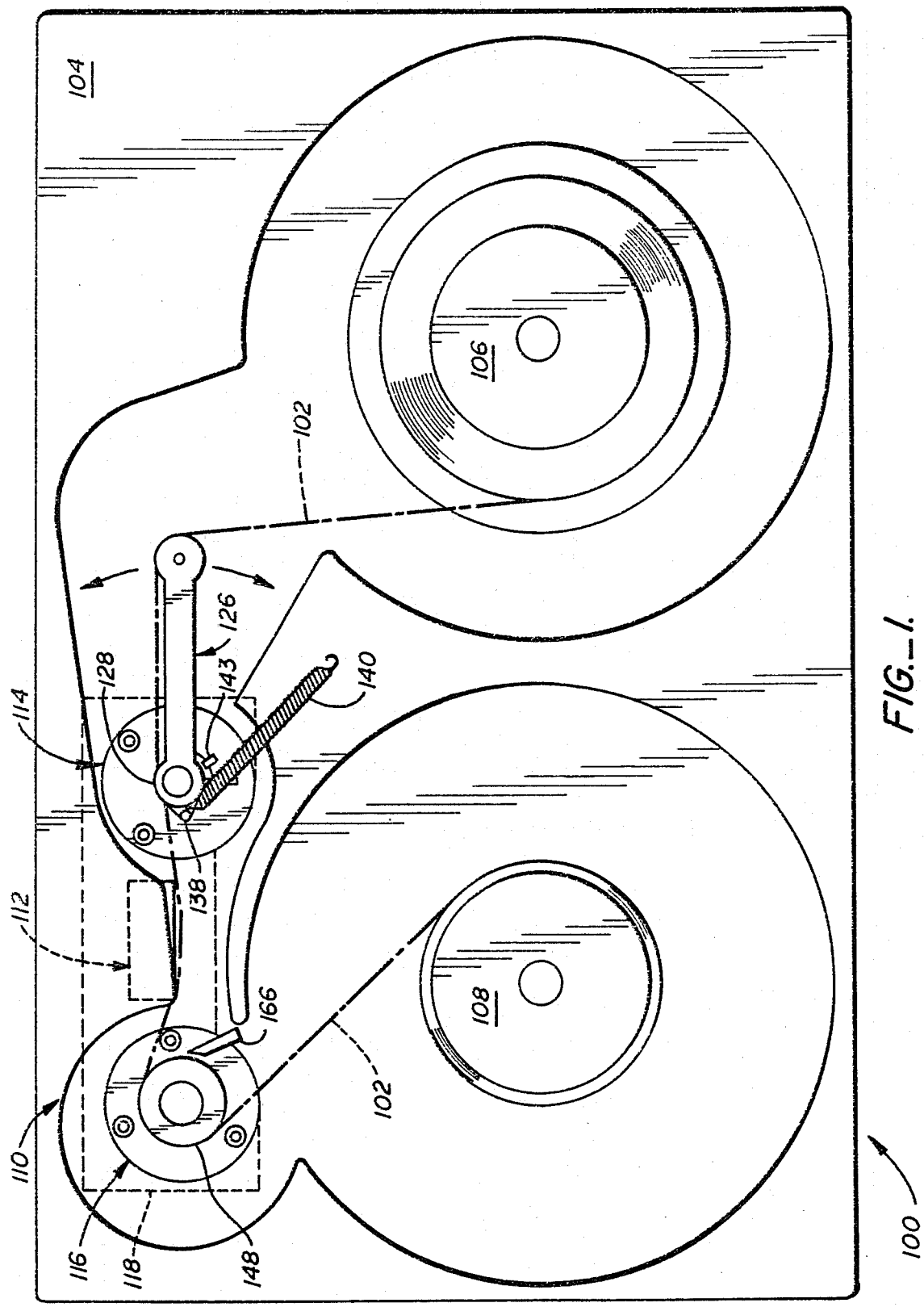
FIG._1.

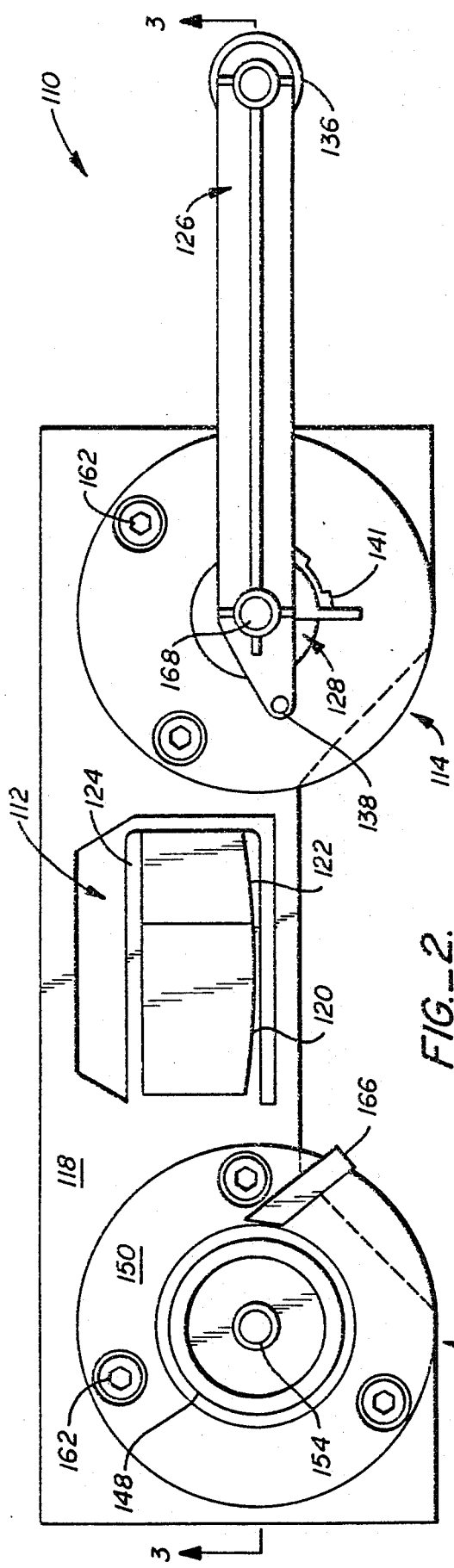
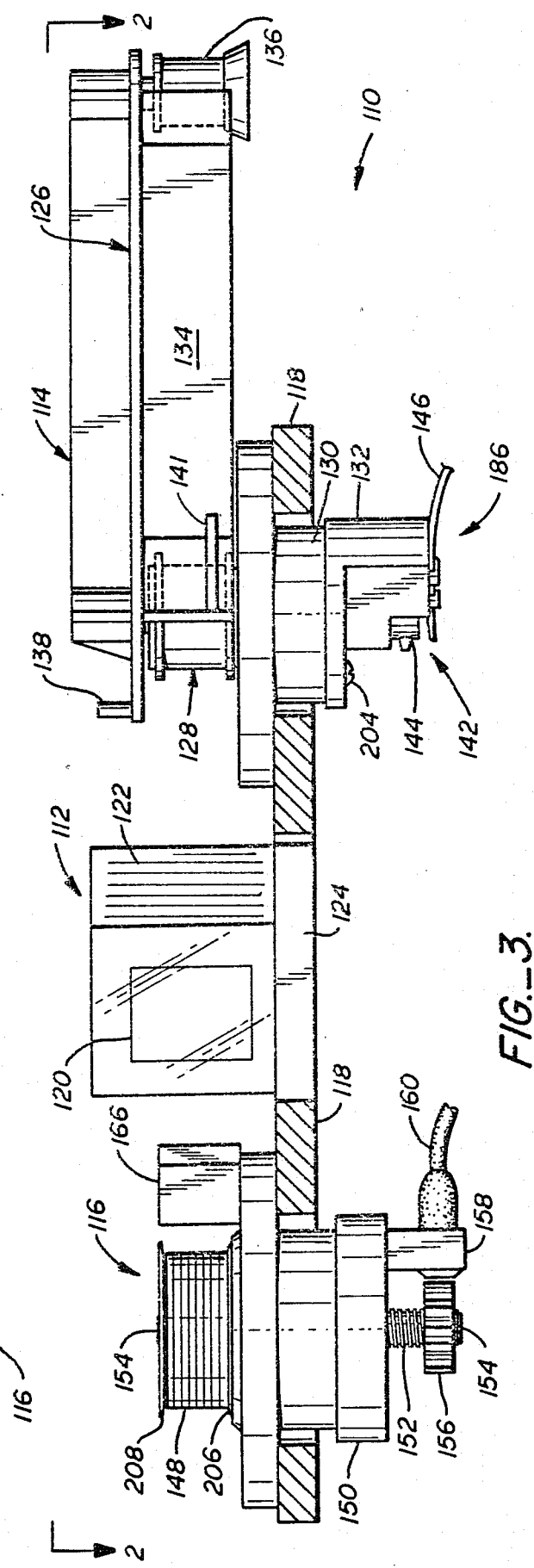
FIG._2.
FIG._3.

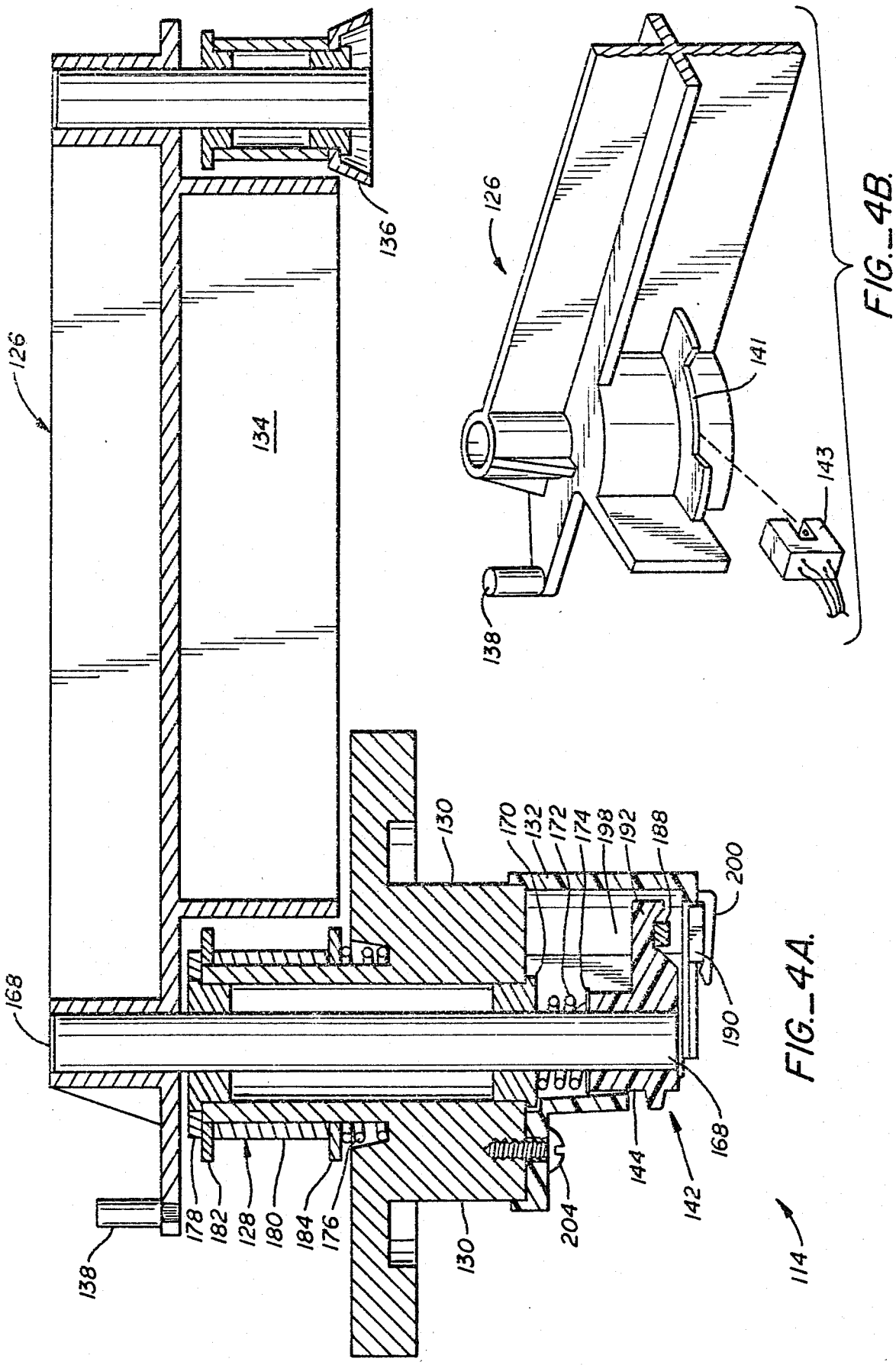

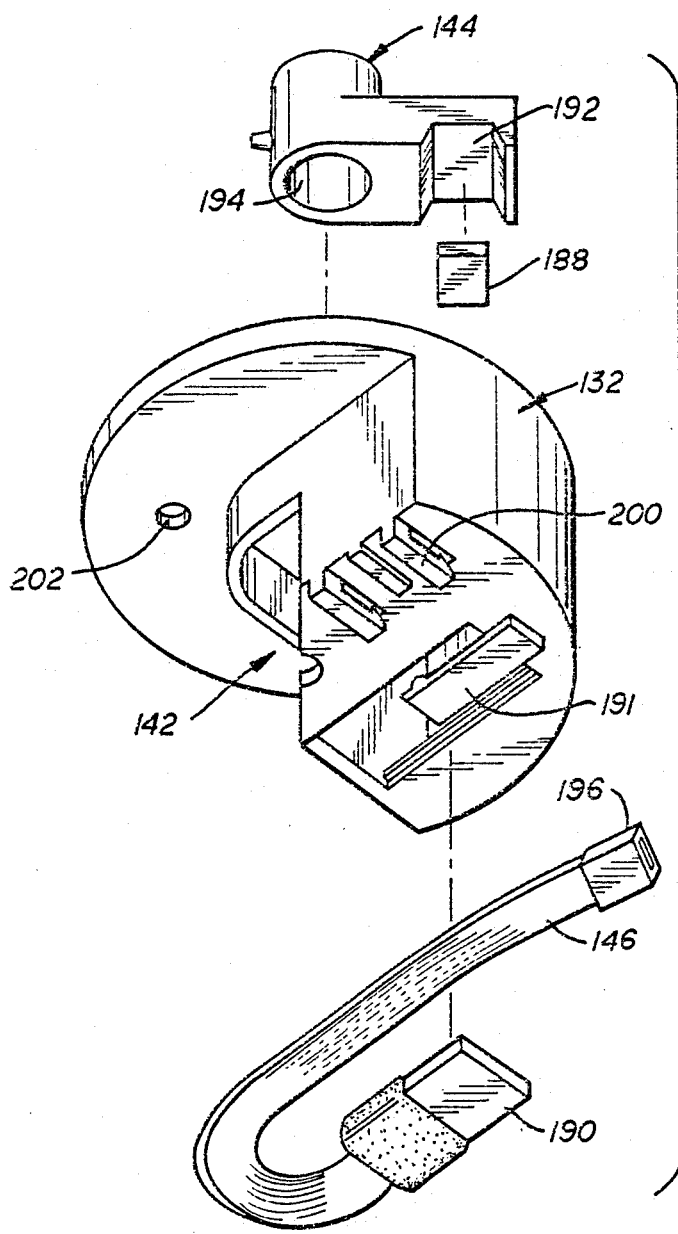
FIG._5.
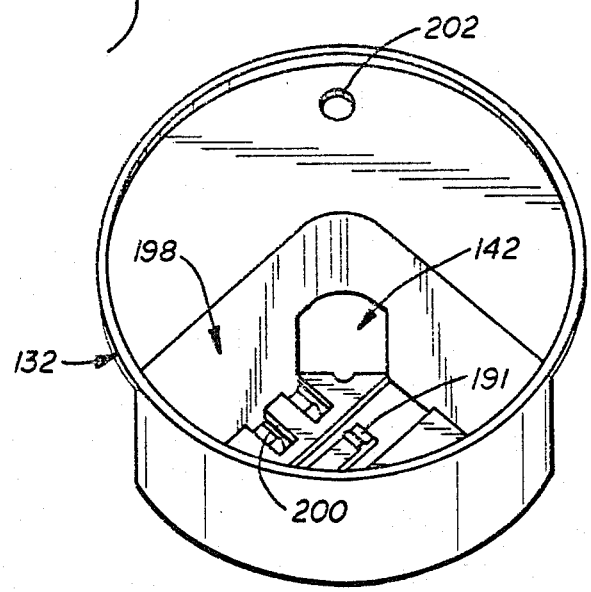
FIG._6.

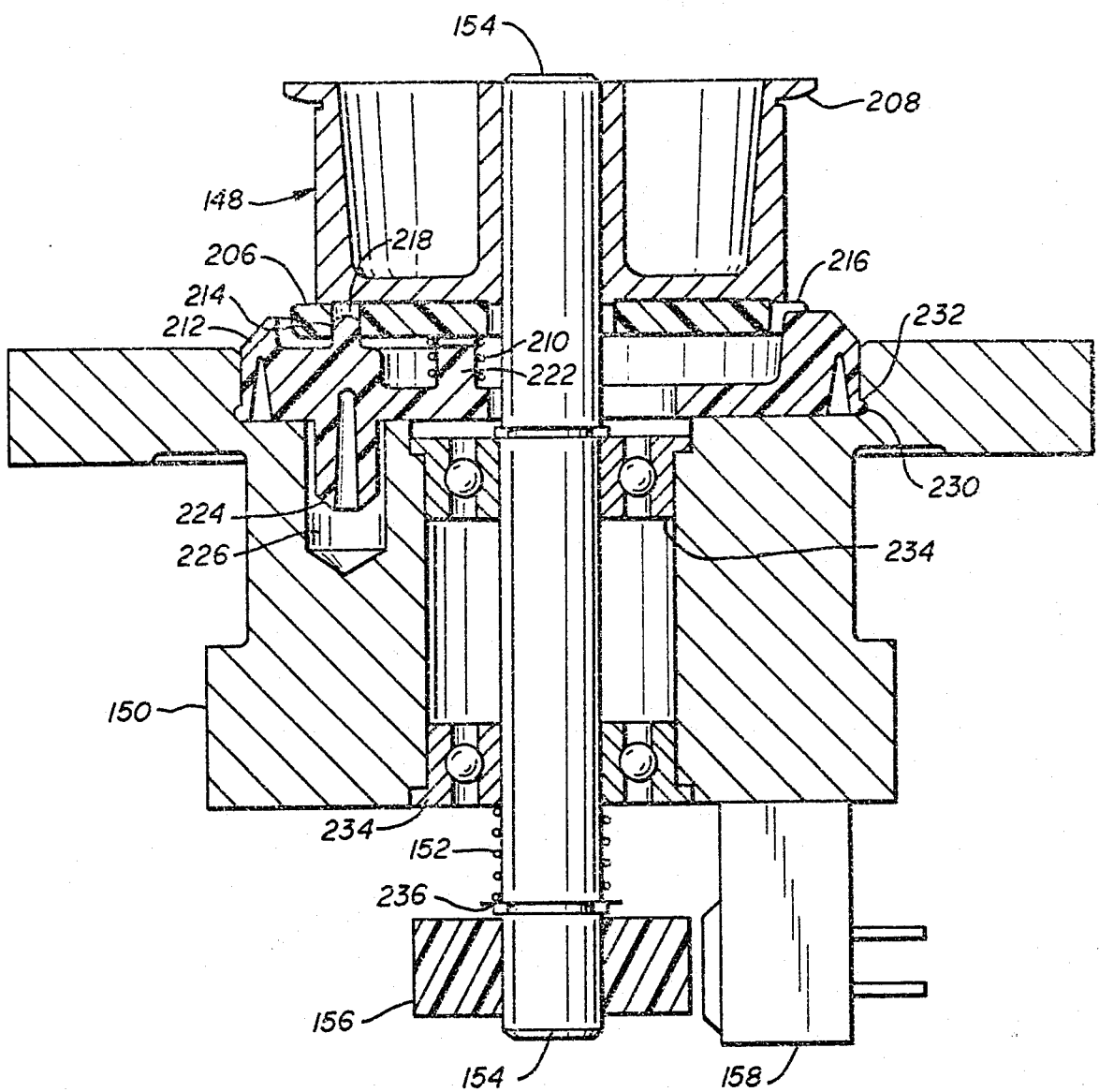
FIG._7

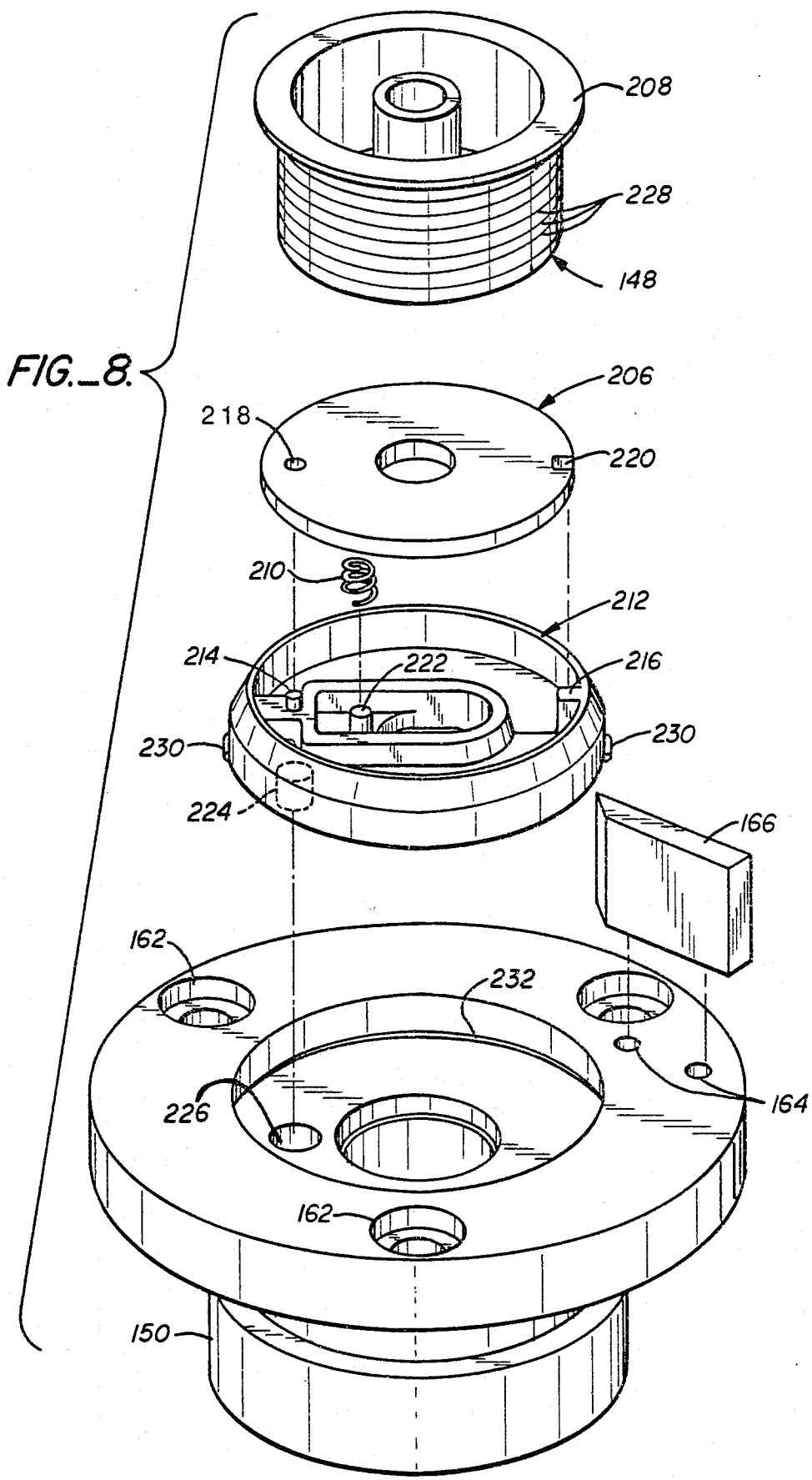
FIG._8.

INTEGRAL TAPE PATH ASSEMBLY INCLUDING SPEED SENSOR GUIDE SUBASSEMBLY WITH OFF-CENTER SPRUNG WASHER

BACKGROUND OF THE INVENTION

The present invention relates to tape recorders, and, more particularly, to a tape path assembly for a streaming tape drive.

Streaming tape drives are high-speed bulk data transfer devices. They have been finding increasing application, for example, as cost-effective archiving and back-up devices for hard disk storage.

In order to handle high-speed bulk data transfers, streaming tape drives can be designed to read and write synchronous parallel tracks of information on rapidly moving magnetic tape media in a relatively dense format.

The basic components of a streaming tape drive include a supply reel, a take-up reel, drive motors for each of the reels, and a head assembly providing read/write and erase functions. Other typical components are tape guides on either side of the head assembly to precisely position the tape on the heads, and a buffer means to maintain tape tension and minimize slack in the tape. In addition, a position sensor, associated with the buffer means, and a tape speed sensor are provided to servo the drive motors and otherwise provide operational feedback to the streaming tape drive system.

One major challenge of high-performance streaming tape drives is that the precise reading and writing of dense parallel tracks imposes severe constraints on the mechanical tolerances of the drive. Misalignment of the tape relative to a read/write head can skew the parallel tracks of data, impairing or at least complicating the operation of a read circuit. Similar problems occur due to elastic and inelastic deformation of the tape itself due to the stresses involved in moving, starting and stopping the tape during operation of the drive.

Some of the more subtle errors due to misalignment can be corrected, for example, by de-skew circuitry. However, there are limits to what can be reliably corrected. De-skew and error correction circuits are not completely effective even at correcting minor errors, and more severe errors, e.g., a tape track being read into the wrong data path at the read head, might preclude correction entirely.

Furthermore, since detected but uncorrected errors are often dealt with by backing up the drive and rereading a portion of the tape, errors due to misalignment propagate themselves. In other words, uncorrected errors result in more stopping and starting of the drive, resulting in more stress on the tape, resulting in greater tape deformation, resulting in greater track-to-track misalignment.

Typically, most of the tape path components affecting tape alignment are mounted on a main casting for the tape recorder. Thus, the tape buffer, a first tape guide, the tape head assembly, a second tape guide and a speed sensor must be precisely positioned with respect to the common casting so that their alignments are properly coordinated. Misalignments can be induced by individual subassembly misalignments, or by deformation of the main casting due to mechanical or thermal stresses. In addition, deformation can cause misalignment over the section of tape extending along the tape path between the supply and take-up reels.

Another problem with the current arrangement is the difficulty of repair. A service person replacing a component is required to replace a single tape path component with the precision required by the mechanical tolerance specifications of the recorder. In addition to the mechanical adjustments, the sensors can require sensitive electronic adjustments upon replacement. For example, a service person might be required to adjust internal potentiometers to set the zero and gain of a tape buffer position sensor.

Since a manufacturer tends to have less control over service personnel than it does its manufacturing personnel, there are greater opportunities for variations in skill. Furthermore, service people are often required to service a great variety of products, and it is difficult for them to be versed in the details of and carry the tools for all service problems for all serviced goods.

Another problem with position sensors arises when they are used to determine when a buffer arm is out of range. For example, an "out of range" signal can be created by comparing the buffer arm position sensor voltage output with a fixed voltage. This approach requires a very accurate and low draft position voltage output from the buffer arm subassembly, and usually requires adjustments. As a result, manufacturing costs are increased, and problems with servicing are exacerbated.

An alternative approach has been to create an "out of range" signal by an optical switch and shutter mounted on the shaft of the buffer arm. This requires extra parts, and can also require adjustments.

What is needed is a streaming tape drive design which provides conveniently for tight mechanical tolerances while also simplifying demands on service personnel. Mechanical tolerances should be improved by reducing the causes of tape distortion, which can also induce misalignment, as well as by providing better mutual alignment of tape path components.

SUMMARY OF THE INVENTION

A streaming tape drive system includes an integral tape path assembly including the heads and other components, which are thus easily aligned on a single compact assembly. The assembly is easily shipped pre-aligned for convenient replacement by service people. In addition, the compact assembly provides for a shorter reel-to-reel tape path so that tape distortions are minimized.

The compact nature of this tape path assembly is provided for in part by integrating the guides with other components, compressing the tape path and reducing the number of separate alignments that need to be performed during manufacture. This, in turn, increases reliability and reduces costs.

More specifically, a fixed guide can be integrated with a buffer arm to compress the supply side of the tape path, while a rolling guide can be integrated with a speed sensor to compress the take-up side of the tape path. Thus, the tape path includes three mechanical subassemblies, heads, buffer arm and fixed guide, and speed sensor and rolling guide.

While, conventionally, speed sensors and tape guides share a common cylindrical geometry, it is no trivial matter to integrate the guide and sensor functions in a high performance streaming tape drive. A speed sensor barrel is designed and arranged to frictionally engage the tape which rotates the barrel, and it is this rotation that is ultimately sensed. However, the very forces that rotate the barrel also can distort and misalign the tape.

Thus, a separate cylindrical barrel is typically employed between a speed sensor and a head subassembly to insulate the critical part of the path across the heads from the forces induced by the speed sensor. Preferably, the frictional contact between the tape and the take-up side guide is kept to a minimum required to vertically align the tape as it glides by. Generally, it is simpler and more effective to employ a fixed, rather than rotating guide.

In accordance with the present invention, the speed sensor and guide functions are integrated by using an off-center spring-loaded fixed orientation washer to position the tape against an upper flange of the rotating barrel. The fixed orientation of the washer serves to minimize frictional drag between it and the tape, to which it applies an upward force. The off-center spring is positioned under the effective center of mass of the tape wrapped around the barrel rather than under the center of the barrel.

The buffer/guide subassembly likewise includes an integrated guide. In this case, a fixed guide is aligned coaxially with the pivot axis of the buffer arm. In this case, the guide barrel is fixed. Again, a sprung washer, in this case centrally sprung, presses the moving tape gently against an upper flange of the fixed tape guide.

The integration of the tape guides with the speed sensor and buffer arm provides for a very compact tape path. Since relatively little tape is off the reels and on the tape path, there is less opportunity for stretching and shearing to impair recorder performance. Also, only three subassemblies need to be coaligned, and this coalignment can be performed off the main casting of the tape deck. This simplifies initial manufacture and greatly facilities tape recorder repair in the field. The completed and aligned tape path assembly can be shipped and readily exchanged by a service person with little or no specialized training.

Manufacturing and service are further simplified by the design of the position sensor for the buffer arm. Coaxial with the fixed guide is a shaft rigidly attached to the buffer arm. The shaft rotates about its axis as the buffer arm pivots. Attached to the shaft is a holder securing a magnet. The magnet and holder are situated within a plastic housing containing a Hall-effect chip, which produces electrical voltages proportional to the magnetic flux through the chip.

The magnetic flux through the chip is a function of the relative orientation of the magnet to the chip and the distance of the magnet from the chip. During calibration, the holder and magnet can be forcibly rotated relative to the shaft upon which the holder is mounted, and thus to the buffer arm, until a zero voltage is read at a nominal zero position for the buffer arm. Additionally, the magnet can be forced up or down axially of the shaft to adjust the gain of the electrical output in response to buffer arm rotations.

In one embodiment, a position sensor housing includes an aperture through which a tool can extend to effect the necessary calibration by rotation and axial translation of the magnet relative to the shaft. Thus, conveniently, the zero position and gain of the buffer arm position sensor can be mechanically calibrated. After calibration, the magnet holder is bonded to the shaft in the calibrated position.

This provision for mechanical calibration offers important advantages over more conventional electronic calibration. In the latter case, potentiometers are used to adjust the output of a position sensor to obtain the desired zero and gain settings. These potentiometers can be placed on a main printed circuit board in the deck or on a separate printed circuit board attached the position sensor housing.

If the potentiometers are on a main circuit board, a calibration must be done after installation. This adds to the manufacturing costs and greatly complicates the tasks of the service person. If the printed circuit board is attached to the housing, this complicates the process of installing the tape path assembly, and adds the cost of the additional printed circuit board. With the mechanical calibration approach disclosed above, final assembly simply involves plugging a cable from the Hall-effect chip into a connection on the main circuit board.

In one realization of the present invention, an "out of range" signal for the buffer arm is provided by a reading of an optical switch straddling a shutter on a buffer arm. If the buffer arm is within its range, then the optical switch shines a beam of light which passes through the shutter, creating an "in-range" signal. If the arm moves outside of its range, the light beam is interrupted by the shutter, creating an "out of range" signal.

BRIEF DESCRIPTION OF THE DRAWINGS

FIG. 1 is a top plan view of a tape drive system incorporating a compact tape path assembly in accordance with the present invention.

FIG. 2 is a top plan view of a tape path assembly included in the tape drive system of FIG. 1.

FIG. 3 is a sectional view of the tape path assembly taken along line 3—3 of FIG. 2.

FIG. 4A is a partially sectional view of a buffer arm and fixed guide subassembly for the tape path assembly of FIG. 2.

FIG. 4B is a perspective view of the buffer arm of FIG. 4A with an integral shutter and an associated optical switch in accordance with the present invention.

FIG. 5 is an exploded view of a position sensor incorporated in the buffer arm and fixed guide subassembly of FIG. 4A.

FIG. 6 is a perspective view of a position sensor housing of the position sensor of FIG. 5.

FIG. 7 is a sectional view of a speed sensor and tape guide subassembly for the tape path assembly of FIG. 2.

FIG. 8 is an exploded view of the speed sensor and tape guide subassembly of FIG. 7.

DETAILED DESCRIPTION OF THE PREFERRED EMBODIMENTS

In accordance with the present invention, a tape drive system 100 for writing to and reading from a magnetic media tape 102 includes a main casting 104, a supply reel 106, a take-up hub 108, and a compact tape path assembly 110, as shown in FIG. 1. In accordance with the present invention, the tape path assembly 110 includes a head subassembly 112, a buffer/guide subassembly 114 and a speed sensor/guide subassembly 116 mounted on a tape path plate 118, as shown in FIGS. 1, 2 and 3.

Among the advantages of this disclosed arrangement is that five functions, buffering, supply side guide, read/write, take-up side guide, and speed sensing are performed in the space of three subassemblies, minimizing the sources and effects of tape stress. Furthermore, reliable mechanical alignment is facilitated by mounting the reduced number of subassemblies on the common base plate 118, rather than mounting separate assemblies directly to the larger main casting 104.

The head subassembly 112 is mounted on a center region of the plate 118. The head subassembly 112 includes a read/write head 120, and a tape cleaner 122, as shown in FIGS. 2 and 3. Also included with the head subassembly are circuity and connectors for receiving and transmitting electrical signals corresponding to tape flux levels, and mechanical means for aligning the heads relative to the tape path. The head subassembly 112 is mounted on a cantilevered portion 124 of the plate 118; the alignment of the read/write head 120 can be adjusted by turning a screw (not shown) disposed to move the cantilevered portion 124 relative to the remainder of the plate 118.

The buffer/guide subassembly 114 includes a buffer arm 126, a fixed guide 128, a buffer base 130 and a position sensor housing 132. As shown in FIG. 3, the buffer base 130 conforms within a circular aperture in the tape path plate 118. The buffer arm 126 includes a skirt 134 which curves at the ends to accommodate the fixed guide 128 and a buffer arm drum 136. This skirt 134 serves to block the air to facilitate auto-loading. The buffer arm 126 also includes a peg 138 which is used to spring load the buffer arm 126 by means of a spring 140 as shown in FIG. 1. The spring 140 provides constant tape tension over the buffer arm travel.

The buffer arm 126 also includes an integral "out of range" optical interrupter shutter 141, shown in FIG. 4B, so that the tape drive system 100 can be shut down if the servo system cannot control the motor's speeds to keep the tape within the buffer's range. An optical switch 143, mounted on base 130 by means not shown, includes a light source mounted in one tine and a light sensor mounted in its other tine. If the buffer arm 126 is within its range, then the optical switch shines a beam of light which passes through the shutter 141, creating an "in range" signal. If the buffer arm 126 moves outside its range, the light beam is interrupted by the shutter 141, creating an "out of range signal."

The position sensor housing 132 has an aperture 142 through which the vertical and rotational position of a magnet holder 144 can be adjusted to calibrate the gain and zero of the position sensor. Signals generated by the position sensor are transmitted along a cable 146 to a printed circuit board (not shown) within the tape drive system.

To the take-up side of the head subassembly 112 is the speed sensor/guide subassembly 116 including a speed sensor tape roller 148, a bearing housing 150, a pre-load spring 152 mounted on a shaft 154, a speed indicator 156 and an optical speed sensor 158 with a wire lead 160 to a printed circuit board for the tape drive system 100. Note that both the bearing housing 150 of the speed sensor subassembly 116 and the base of the buffer arm include mounting holes 162 for ready attachment to the tape path plate 118. The bearing housing 150 also includes two holes 164, shown in FIG. 8, by means of which a tape shield 166, shown in FIG. 1, is positioned.

The components operate in a relatively straightforward manner. The tape 102 is fed from the supply reel 106 through the tape path to the take-up hub 108, as shown in FIG. 1. The spring-loaded buffer arm engages the passing tape and takes up slack as it occurs. The buffer arm 126 pivots to take up slack, and this pivoting motion is detected by the position sensor 186 to be described below. This detection is fed back to a control system which regulates supply and take-up motors (not shown) accordingly.

The fixed guide 128 and the speed sensor tape roller 148 align the tape 102 with respect to the read/write head 120. The speed sensor tape roller 148 frictionally engages the tape 102 so that the passing tape drives the shaft 154 on which the speed indicator 156 is mounted. The speed indicator 156 can be a disk-shaped element with vertical marks about its rim. The rate these marks move by speed sensor 158 provides a tape speed reading which is used, along with position sensor readings, by the servo system to regulate the supply and take-up motors.

Describing the buffer/guide subassembly 114 in greater detail with reference to FIG. 4A, the buffer arm 126, together with its peg 138, skirt 134, tape drum 136, and a rigidly attached shaft 168, are permitted to pivot, over a 32° range, relative to the buffer base 130 as provided by a bearing 170. Vertical positioning is provided by pre-load spring 172, bound by retainer ring 174. The fixed guide, which is separated from the buffer arm proper by a spacer 178, includes a tape ring 180, and an upper ceramic washer 182 and a lower ceramic washer 184, loaded by spring 176, which constrain the vertical position of the passing tape 102.

This arrangement allows the tape buffering and supply side tape guiding to be done with a single subassembly. The buffer/guide subassembly 114 is compact enough to be accommodated conveniently on the same plate that houses the head subassembly 112. This compact arrangement minimizes the causes and effects of skew and other problems by allowing a shortened tape path. Also, only one mechanical connection is required to mount the components to perform both the buffering and guiding functions. This reduces the number of precision mechanical alignments in the final tape drive system 100, thereby increasing reliability and lowering costs.

Further advantages are obtained in the manner the position sensor 186 is implemented. The position sensor 186 includes a magnet 188 fixed within the magnet holder 144 which is mounted on the buffer arm shaft 168. Mounted within the position sensor housing 132, by means of clip 191, is a Hall-effect chip 190 which converts magnetic fluxes into electrical voltages.

The components of the position sensor 186 are further detailed with reference to FIG. 5. The magnet holder 144 includes a bracket 192 for accommodating the magnet 188. The magnet holder 144 incorporates a hole 194 dimensioned to frictionally engage the buffer arm shaft 168. A connector 196 allows the position sensor cable 146 to be conveniently connected to and disconnected from a circuit board, not shown.

The position sensor housing 132 defines a cavity 198 of generally triangular cross section to permit the magnet holder 144 and magnet 188 to rotate freely over the 32° range permitted the buffer arm 126. The position sensor housing 132 also includes a clip 200 which engages the position sensor cable 146 so as to provide a strain relief function during assembly and disassembly. An aperture 202 provides for a bolt 204 FIG. 4A, to secure the position sensor housing 132 to the buffer base 130.

Aperture 142, shown in FIG. 6, of the position sensor housing 132 is provided as access to adjust the position of the magnet holder 144 relative to the shaft 168. As best illustrated in FIG. 4A, the magnet holder 144 protrudes through this aperture 142 at which point it can be engaged by a tool (not shown). By pivoting the magnet holder 144 relative to the shaft 168, the zero flux, and thus zero voltage, position of the magnet relative to the buffer arm can be adjusted precisely. Additionally, axial movement of the magnet holder 144 affects the intensity of the magnetic field induced by the magnet 188 at the Hall-effect chip 190, which affects the degree to which a given orientation offset induces voltage. Thus axial adjustments permit calibration of gain, just as adjustments of manget orinetation permit calibration of the zero position.

Thus, in accordance with one aspect of the present invention, the zero position and gain of the position sensor can be mechanically adjusted after assembly of the buffer/guide assembly 114 is completed. This mechanical adjustment is simple and cost-effective from a manufacturing perspective. From a service perspective, a service person is freed from contending with zero and gain calibrations since the entire buffer and guide subassembly can be replaced by removing a few screws on the buffer base 130 and disconnecting the position sensor cable 146. Thus, the present invention provides significant manufacturing and service advantages over prior art devices.

With respect to the integration of the take-up side tape guide with the speed sensor, similar advantages are obtained, but different challenges had to be addressed. The requirements of a speed sensor and a standard tape guide are opposed. A speed sensor requires considerable frictional contact with a passing tape so that slippage is minimized to maintain accurate monitoring of the tape speed. On the other hand, tape guides are usually arranged to have the minimal contact required to guide the tape, excess friction being avoided as a source of tape distortion.

In accordance with one aspect of the present invention, the speed sensor assembly 116, illustrated in FIG. 7, includes an off-center sprung fixed-orientation ceramic washer 206 which serves to urge the passing tape 102 against a top flange 208 of the speed sensor tape roller 148. The fixed orientaion of the washer reduces the friction at the base of the tape where a major potential for distortion could otherwise prevail. Note that grooves 228 are etched into the roller 148 to enhance frictional contact between the tape 102 and the roller 148.

An off-center spring 210, FIG. 8, applies a load to the passing tape such that the load is positioned under the effective center of mass of the tape wrapped around the roller 148. Positioning of the spring 210 under the roller 148 causes the washer 206 to be non-parallel with the tape due to uneven loading. This skewing of the washer can cause the tape 102 to deform or misalign so as to produce skew at the read/write head.

A washer retainer 212 provides a seating for the fixed washer 206. A peg 214 and a protrusion 216 of the retainer 212 respectively engage a hole 218 and a notch 220 of the washer 206 to fix the orientation of the latter. Another peg 222 serves to position the off-center spring 210 properly against the washer 206.

The stainless steel shaft 154 extends through central holes in the tape roller 148, the ceramic fixed washer 206, the washer retainer 212 and the bearing housing 150, as indicated by comparison of FIGS. 7 and 8. The washer retainer 212 includes a downward facing peg 224 which is inserted into hole 226 of the bearing housing 150 to fix the orientation of the retainer 212. A cantilevered ridge 230 of the retainer 212 engages a circumferential groove 232 in the bearing housing 150 to secure their relative positions upon assembly.

As illustrated in FIG. 7, the bearing components 234 facilitate rotation of the roller 148 and shaft 154 within the bearing housing 154. The pre-load spring 152 is held in place by a snap ring 236. As indicated above, the speed sensor 158 records passing marks of the speed indicator 156 mounted on the shaft 154.

Thus, by the incorporation of the off-center sprung fixed washer 206, a practical integration of speed sensor and tape guide functions is achieved. As in the case of the integration of the buffer and tape guide functions of the supply side of the heads 120 and 122, this makes the tape path more compact and less susceptible to distortions and misalignments.

Accordingly, an improved tape path assembly, incorporating a novel sensor/guide subassembly, and a novel buffer arm/guide subassembly, the latter incorporating novel position and out-of range indicators, is provided by the present invention.

What is claimed is:

1. A tape path assembly comprising a base plate, a transducer subassembly, a buffer/guide subassembly, and a speed sensor/guide subassembly, and means for precisely positioning said subassemblies with respect to said base plate, said speed sensor/guide subassembly including a washer and a roller, said roller having a cylindrical portion defining a cylindrical space having an axially directed segment along which a passing tape applies maximal force, said roller also having a flange at one end of said cylindrical portion for contacting a first edge of a passing tape so as to limit axial displacement of the tape, said washer being disposed at a second end of said cylindrical portion so as to engage a second edge of said tape to urge said first edge against said flange so as to further constrain the axial movement of said tape, said roller being adapted for frictionally engaging said passing tape and for rotating about the axis of said cylindrical portion, said washer being fixed in orientation with respect to said cylindrical space, said washer being off-center sprung so as to apply a force under the center of mass of said tape wrapped around said roller.

2. In a system for reading a tape medium, a speed sensor/guide subassembly comprising a washer and a roller, said roller having a cylindrical portion defining a cylindrical space having an axially directed segment along which a passing tape applies maximal force, said roller also having a flange at one end of said cylindrical portion for contacting a first edge of a passing tape so as to limit axial displacement of the tape, said washer being disposed at a second end of said cylindrical portion so as to engage a second edge of said tape to urge it against said flange so as to further constrain the axial movement of said tape, said roller being adapted for frictionally engaging said passing tape and for rotating about the axis of said cylindrical portion, said washer being fixed in orientation with respect to said cylindrical space, said washer being off-center sprung so as to apply a force under the center of mass of said tape wrapped around said roller.

3. A tape drive system comprising:
a tape supply means for supplying and storing magnetic tape;
a take-up means for receiving and storing tape supplied by said tape supply means;
drive means for controlling said tape supply means and said take-up means, said drive means being responsive to control signals;

a tape path assembly including a base plate, a transducer subassembly, a buffer/guide subassembly, and a speed sensor/guide subassembly, said subassemblies being mounted on said base plate, said speed sensor/guide subassembly including a washer and a roller, said roller having a cylindrical portion defining a cylindrical space having an axially directed segment along which a passing tape applies maximal force, said roller also having a flange at one end of said cylindrical portion for contacting a first edge of a passing tape so as to limit axial displacement of the tape, said washer being disposed at a second end of said cylindrical portion so as to engage a second edge of said tape to urge it against said flange so as to further constrain the axial movement of said tape, said roller being adapted for frictionally engaging said passing tape and for rotating about the axis of said cylindrical portion, said washer being fixed in orientation with respect to said cylindrical space, said washer being off-center sprung so as to apply a force under the center of mass of said tape wrapped around said roller.

4. In a system for reading tape media, a speed sensor/guide subassembly comprising a washer and a roller, said roller having a cylindrical portion defining a cylindrical space having an axially directed segment along which a passing tape applies maximal force, said roller also having a flange at one end of said cylindrical portion for contacting a first edge of a passing tape so as to limit axial displacement of the tape, said washer being disposed at a second end of said cylindrical portion so as to engage a second edge of said tape to urge it against said flange so as to further constrain the axial movement of said tape, said roller being adapted for frictionally engaging said passing tape and for rotating about the axis of said cylindrical portion, said washer being fixed in orientation with respect to said cylindrical space, said washer being off-center sprung so as to apply a force diametrically opposed to the centripetal force applied to said roller by said passing tape.

* * * * *